Sept. 8, 1925.  1,552,522
R. B. VINCENT
SCREW OPERATED WIRE GRIP FOR WIRE STRETCHERS
Filed March 14, 1925

Inventor:
Robert B. Vincent
By Silas Sweet
Atty.

Patented Sept. 8, 1925.

1,552,522

UNITED STATES PATENT OFFICE.

ROBERT B. VINCENT, OF KEOTA, IOWA.

SCREW-OPERATED WIRE GRIP FOR WIRE STRETCHERS.

Application filed March 14, 1925. Serial No. 15,681.

*To all whom it may concern:*

Be it known that I, ROBERT B. VINCENT, a citizen of the United States of America, and resident of Keota, Keokuk County, Iowa, have invented a new and useful Screw-Operated Wire Grip for Wire Stretchers, of which the following is a specification.

An object of this invention is to provide an improved construction for a wire gripping device for wire stretching machines.

A further object of this invention is to provide improved means for receiving, retaining and gripping a wire.

My invention consists in the construction, arrangement and combination of elements hereinafter set forth, pointed out in the claims and illustrated by the accompanying drawing, in which—

Figure 1:
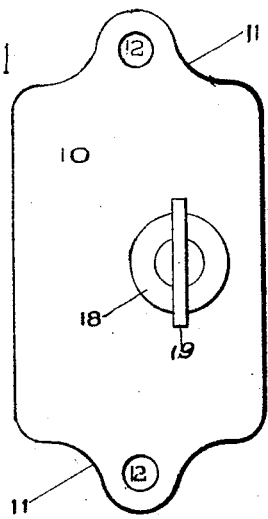
Figure 2:
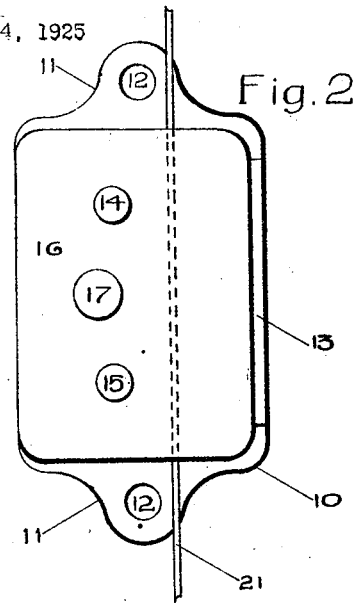
Figure 3:
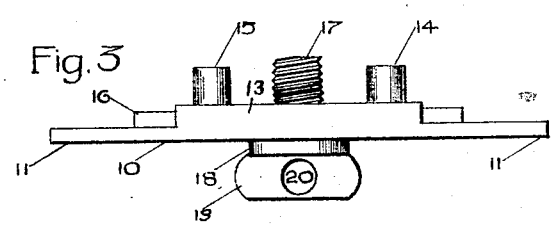
Figure 4:
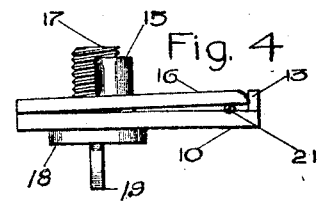

Figure 1 is one face view and Figure 2 the opposite face view of the complete device. Figure 3 is an edge view of the same. Figure 4 is an end view of the same.

Figure 5:
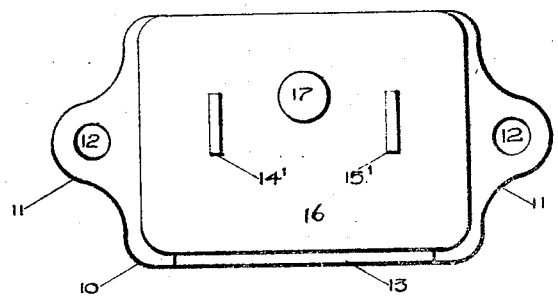
Figure 6:
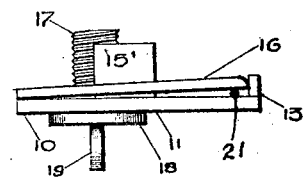

Figures 5 and 6 are face and end views, respectively, of a similar device, slightly modified in construction.

In the construction of the device as shown the numeral 10 designates a base plate formed with an ear 11 on each end, each ear being formed with a hole 12 adapted for use in attaching the plate at either end to a wire-stretching machine (not shown). A flange 13 is formed on one side margin of the base plate 10 and is of less length than said plate. Studs 14, 15 are formed on the base plate 10 in spaced relation and in a row adjacent the median line of the plate and extend at right angles thereto. A cap plate 16 is mounted on one face of the base plate 10 and is formed with holes adapted for the passage therethrough of the studs 14, 15, one side margin of the cap plate being located adjacent the inner face of the flange 13. The cap plate 16 is free to move on the studs to and from the base plate and has some movement of oscillation on said studs. Registering holes are formed in the base and cap plates and the hole in the cap plates is threaded. A screw 17 is mounted in the registering holes in the plates and is screwed into the hole in the cap plate. The screw 17 is formed with a boss or fixed washer 18 on its outer end adapted to contact with the outer face of the base plate and also is formed with a thumb-piece or relatively thin outstanding head 19 outside of said boss, which thumb-piece is formed with a hole 20 adapted to receive a tool, such as a spike or screw-driver, not shown, to assist in turning the screw. The studs 14, 15 are so arranged relative to the screw 17 as to protect the threads of said screw from contact by the wire to which the device is clamped.

In the modification shown in Figures 5 and 6 the studs 14', 15' are relatively wide and flat and have their widths transversely of the plate 10 and they extend through slots of similar shape in the cap plate 16. The wide flat shape of the studs and the use of slots therefor tends to stability in the connection between the plates 10 and 16.

In practical use the screw is loosened and withdrawn sufficiently to permit the separation of the plates to an extent to admit a wire within the flange 13 and between the plates, after which the plates are drawn together by tightening of the screw and are thus caused to clamp on and grip said wire so that, when the stretching operation or draft is applied to either end of the base plate, said wire will not slip therein, but will be stretched thereby.

I claim as my invention:—

1. A wire-gripping device, comprising opposing plates, means for attaching one of said plates to a stretching machine, studs fixed to the latter plate and extending loosely through and beyond the outer face of the other plate; and a screw connecting said plates and adapted to clamp them together, said plates being adapted to clamp a wire located between one margin thereof and the line of the studs, said screw being located between the studs and on the opposite side of the line thereof from said wire.

2. A wire-gripping device, comprising opposing plates, studs on one plate adapted to pass through holes in the other plate, the plate being adapted to receive a wire between them, a screw extending through and threaded in one of said plates between and at one side of the line of said studs, whereby said studs protect said screw from contact with said wire, and means for connecting one of said plates to a stretching machine.

3. A wire-gripping device, comprising opposing plates, one formed with a side flange, guiding devices connecting said plates loosely, and a screw connecting said plates, a wire being adapted to be placed between said plates between said guiding devices and flange, said screw being located on the opposite side of the line of the studs from said wire.

Signed at Keota, in the county of Keokuk and State of Iowa, this 21st day of February, 1925.

ROBERT B. VINCENT.